United States Patent [19]

Johns et al.

[11] 4,193,485
[45] Mar. 18, 1980

[54] AIR PRESSURE LOADED CLUTCH

[75] Inventors: Marvin D. Johns; Gordon W. Denton, both of Fort Wayne; Ronald E. Heymann, Auburn, all of Ind.

[73] Assignee: Dana Corporation, Toledo, Ohio

[21] Appl. No.: 865,542

[22] Filed: Dec. 29, 1977

[51] Int. Cl.² ............................................. F16D 25/08
[52] U.S. Cl. .............................. 192/85 CA; 192/88 A; 192/91 A
[58] Field of Search ............ 192/85 CA, 88 A, 91 A, 192/85 C, 91 R

[56] References Cited

U.S. PATENT DOCUMENTS

| | | | |
|---|---|---|---|
| 2,275,204 | 3/1942 | Smirl | 192/88 A |
| 2,668,610 | 2/1954 | Backus | 192/88 X |
| 2,890,776 | 6/1959 | Aschauer | 192/88 X |
| 3,157,257 | 11/1964 | Root | 192/85 CA X |
| 3,412,834 | 11/1968 | Root | 192/85 CA X |

FOREIGN PATENT DOCUMENTS 1198927  6/1959  France ................................. 192/88 A Primary Examiner—George H. Krizmanich
Attorney, Agent, or Firm—Robert M. Leonardi

[57] ABSTRACT

A self-contained hydraulic unit is provided for controlling operation of a friction clutch assembly. The hydraulic unit is connected to a source of pressure so that when pressure is applied to the unit it responds to actuate a plurality of levers to engage the clutch. Upon removal of pressure from the hydraulic unit, spring means responds to withdraw the levers and disengage the clutch. The hydraulic unit is non-rotatably supported by the friction clutch assembly and includes an axially fixed member and an axially movable member interconnected by a sliding connection. A piston and diaphragm arrangement is provided between the fixed and movable members so that when pressure is introduced into the diaphragm the piston operates to slide the movable member relative to the fixed member by means of the sliding connection thereby actuating the levers to cause engagement of the clutch.

4 Claims, 2 Drawing Figures

AIR PRESSURE LOADED CLUTCH

BACKGROUND OF THE INVENTION

This invention relates to a lever operated friction clutch and more particularly to a hydraulic unit for operating such a clutch.

Hydraulically operated friction clutches are well known and have found wide acceptance in the market place since they eliminate the need for external linkage such as levers, links and springs required to effect the operation in mechanically operated clutches. Not only do the hydraulic units require less space than the mechanical units but they also permit a vehicle operator to make use of a hydraulic system which is already available on existing highwayvehicles.

Hydraulic units are provided which operate to effect both the engaging and disengaging operation of the clutch and also to control these operations independent of each other. In the latter case, the opposite operation is achieved by some form of resilient means. For example, if the hydraulic unit is responsive to apply a pressure to effect clutch engagement then the resilient means is made to respond to disengage the clutch.

For a number of reasons, it has been found that the most satisfactory arrangement is one in which the hydraulic unit performs only one of the operations and the resilient means the other. One major reason for this is that less hardware is required. If the hydraulic unit is used for both operations, additional circuitry and controls are required. Not only does this increase the cost of the unit but it further makes such an arrangement undesirable since it requires much more space. Further, there is a definite advantage in having a unit in which the normally engaged position is achieved by the hydraulic unit and the resilient means is responsive to disengage the clutch. This type of construction provides an operator with a failure mode which is more desirable, i.e., if the hydraulic system malfunctions, the clutch will assume a disengaged position since the resilient means takes over in the absence of hydraulic pressure.

While hydraulic units designed to provide a pressure to accomplish one of the operations and resilient means for the other are generally satisfactory, they do have certain shortcomings. One of the drawbacks in known hydraulic units of this type is that they are constructed to fit specific applications and cannot be substituted for or in the space normally occupied by the mechanical operating parts in existing clutch applications. Also, many of these units are not easily serviceable because of the location of the unit and also the complicated or oversized construction of the operating parts.

The present invention is intended to solve the above problems by providing a hydraulic unit which is compact and readily adaptable for use in conventional clutch applications.

SUMMARY OF THE INVENTION

The above object is achieved in the present invention by providing a non-rotatable hydraulic unit which consists of a minimum number of parts. The parts are constructed and arranged in a compact manner so as to be readily adapted to replace and fit in the same space occupied by the mechanical parts of a conventional mechanically operated friction clutch. In a preferred embodiment, the hydraulic unit includes a non-rotatable housing supported by the clutch cover and a piston slidably connected to the housing and supported by the clutch operating collar. An expansible diaphragm is interposed between the housing and piston and is operable to slide the piston relative to the housing to effect clutch operation.

Other objects, features and advantages of the present invention will become apparent from the detailed description and drawings of the preferred embodiment.

DESCRIPTION OF THE PREFERRED EMBODIMENT

Figure 1:
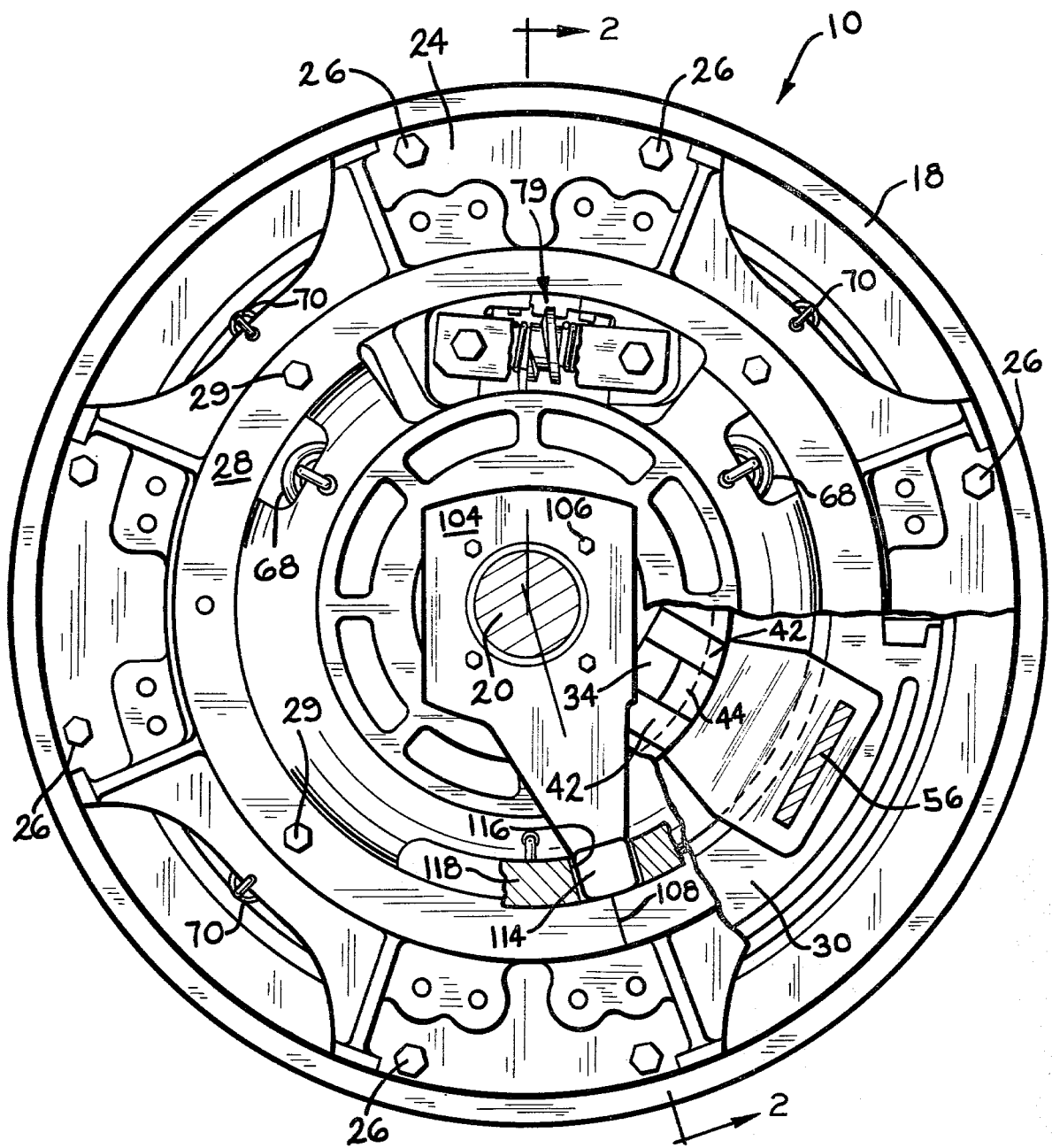
FIG. 1 is an end elevational view of a clutch embodying a preferred embodiment of the invention with parts broken away for convenience of illustration.
Figure 2:
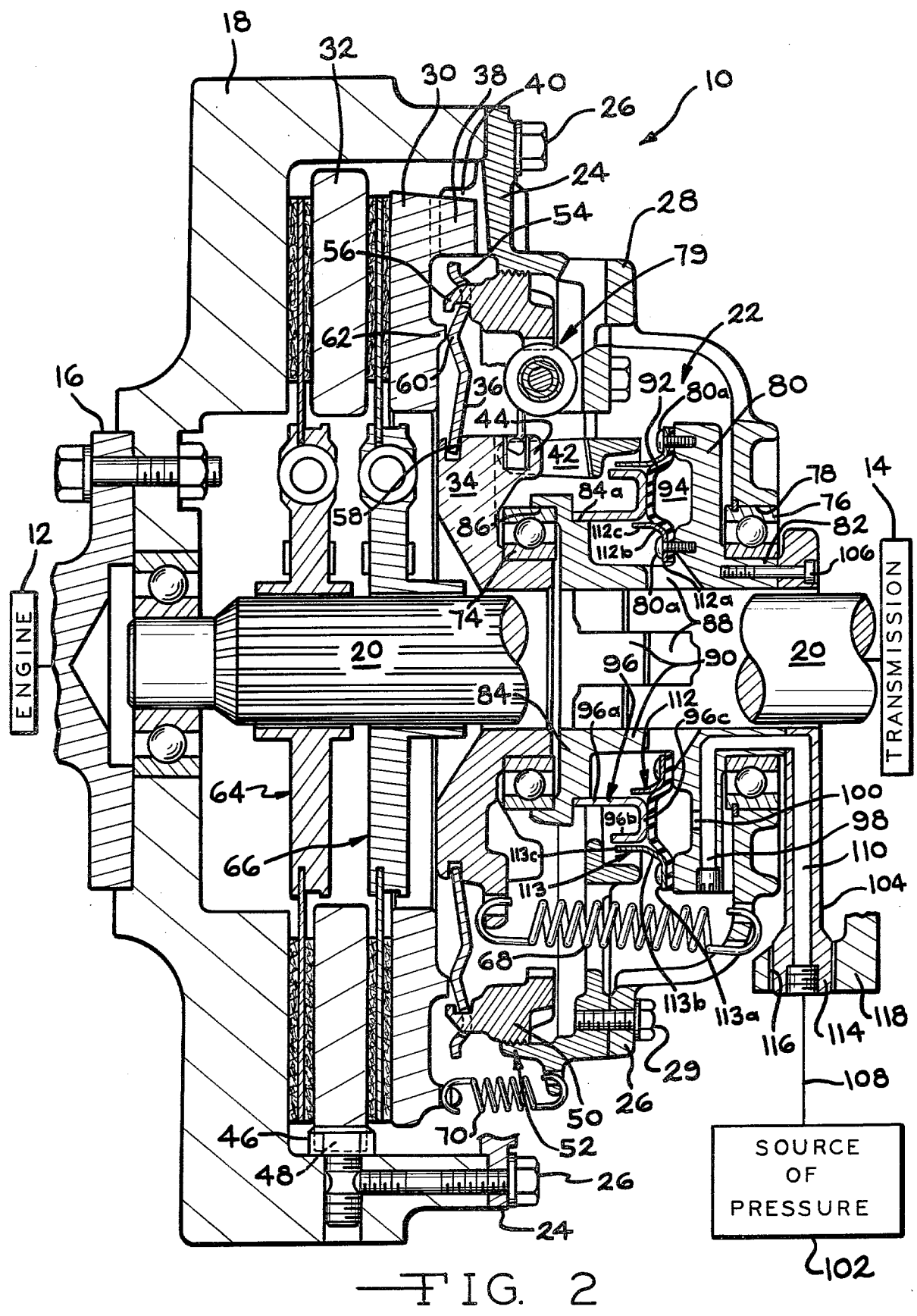
FIG. 2 is an enlarged sectional view taken substantially along line 2—2 of FIG. 1.

Referring to the drawings, in the preferred embodiment, a pull-type friction clutch is shown generally at 10. The clutch 10, as illustrated in FIG. 2, is positioned between a vehicle engine 12 and a change speed transmission 14. Drive from the engine 12 is transmitted by means of a crankshaft 16 to a flywheel 19. The clutch 10 is provided with a drive portion connected to the flywheel 18 so as to be rotatable therewith and a driven portion connected to an input shaft 20 extending into the transmission 14 for driving a transmission input gear (not shown).

Clutch 10 is used to disconnect the engine 12 from the transmission 14 when the vehicle operator shifts gears and also to discontinue drive to the rear driving wheels of a vehicle (not shown).

When the clutch 10 is connected to the flywheel 18, the drive and driven portions are engaged and the transmission input shaft 20 receives power directly from the engine driven crankshaft 16. When the drive and driven portions of the clutch 10 are disengaged, the clutch 10 is disconnected from the flywheel 18 and the transmission input shaft 20 receives no power.

A non-rotatable hydraulic unit, indicated generally by the reference numeral 22, is operative when pressurized to maintain the drive and driven portions of the clutch 10 in a normally engaged position so that the clutch 10 passes power directly from the flywheel 18 to the transmission input shaft 20. Suitable resilient means is provided for the clutch 10 to disconnect the drive and driven portions when pressure is removed from hydraulic unit 22. The resilient means will be discussed in greater detail subsequently.

In the preferred embodiment, the rotatable portion of clutch 10 includes a cover assembly in the form of a ring member 24 secured to the flywheel 18 by a plurality of bolts 26 and a housing 28 secured to the ring member 24 by a plurality of bolts 29. The rotatable portion further includes operating means for cooperating with the driven portion of the clutch 10 for engaging and disengaging the same with respect to the flywheel 18. The operating means consists of an axially movable pressure plate 30, an axially movable intermediate plate 32, an axially movable actuator collar 34 and a plurality of radially extending levers 36.

In order to operate in a satisfactory manner, it is essential that all the elements of the operating means rotate in unison with the flywheel 18. To this end, pressure plate 30 is adapted to be drivingly connected to ring member 24 and axially movable relative thereto. This is accomplished by means of a plurality of drive lugs 38 extending axially from the rear face of the pressure plate 30 into registering slots 40 formed on the interior of the ring member 24. Means is also provided to rotatably connect the actuator collar 34 to the ring member 24 and also permit it to be axially movable relative thereto. For this purpose, axially inwardly directed spaced projections 42 on the ring member 24 form pockets for receiving axially outwardly projecting lugs 44 provided on the actuator collar 34. The means to permit the intermediate plate 32 to function in this manner includes a plurality of drive pins 46 extending radially inwardly from the flywheel 18 and registering with drive slots 48 formed on the outer periphery of the intermediate plate 32.

Also constituting a part of the cover assembly is a conventional adjusting ring 50. As best seen in FIG. 2, the adjusting ring 50 is peripherally connected to the interior of the ring member 24 by means of a threaded connection shown generally at 52. This threaded connection permits the adjusting ring 50 to be circumferentially rotated relative to the ring member 24 in a well known manner to effect axial movement of the adjusting ring 50 with respect to the ring member 24 and other related parts of the clutch 10 and thereby maintain a proper clamping force for operating the clutch.

The clamping force is achieved through the levers 36 which are pivotally disposed between the adjusting ring 50 and pressure plate 30 and pivotally actuated by the collar 34. More specifically, the outer ends of the levers 36 are constructed with a pivot portion 54 cooperating with pivot means 56 on the adjusting ring 50. The inner ends of levers 36 are received in an annular groove 58 in collar 35. Intermediate the ends, the levers 36 are provided with a bearing portion 60 cooperating with an annular bearing engaging means 62 on the pressure plate 30.

As previously stated, the pressure plate 30 intermediate plate 32 and collar 34 are axially movable. The axial movement occurs in response to pressure applied to the hydraulic unit 22. When pressure is applied to the hydraulic unit 22 it will cause the collar 34 to move axially toward the flywheel 18 pivoting levers 36 so that pressure plate 30 and intermediate plate 32 are shifted axially in the same direction.

The driven portion of the clutch 10 includes a pair of friction disc assemblies 64 and 66 which are splined for rotation and axial relative movement on the forward end of the transmission input shaft 20. Friction disc assembly 64 is positioned between the flywheel 18 and intermediate plate 32 and friction disc assembly 66 is positioned between the intermediate plate 32 and pressure plate 30. With this arrangement, when the hydraulic unit 22 is pressurized to cause axial movement of the collar 34, the levers 36 are pivoted about the pivot engaging means 56 pressing pressure plate 30, friction disc assembly 66, intermediate plate 32 and friction disc assembly 64 into frictional clamping engagement with the flywheel 18.

The clutch 10 is shown as being a normally engaged clutch, i.e., the friction disc assemblies 64 and 66 are maintained in a normally engaged or clamped position between the flywheel 18 and the pressure plate 30. This is accomplished by applying pressure to the hydraulic unit 22. In order to disengage the clutch 10, pressure is removed from the hydraulic unit 22 and the previously mentioned resilient means becomes active to effect the disengaging operation.

In the present instance, the resilient means takes the form of a plurality of coiled springs 68 having one end connected to the collar 34 and its opposite end connected to the housing 28. The connection is such that when the hydraulic unit 22 is inactive, i.e., not pressurized, the collar 34 is free to be withdrawn away from the flywheel 18 by action of the springs 68. This movement allows the lever 36 to swing about pivot engaging means 56 to move the bearing portion 60 thereon away from contact with the bearing engaging means 62 on the pressure plate 30. In so doing, a plurality of circumferentially spaced retraction springs 70, connected between ring member 24 and pressure plate 30, respond to withdraw the pressure plate 30 out of engagement with the friction disc assembly 66 thereby removing the clamping pressure and disengaging the power flow to the transmission input shaft 20.

A self-adjusting device is shown generally at 79 for automatically effecting adjustment of the adjusting ring 50 with respect to the ring member 24 to compensate for wear of the friction faces of friction disc assemblies 64 and 66. The adjusting device 79 is constructed in accordance with the teachings of U.S. Pat. No. 3,752,286 and is disposed between the adjusting ring 50 and actuator collar 34, so as to be operative to sense wear travel of the actuator collar 50 and thereby circumferential rotation of the adjusting ring 50 relative to the ring member 24.

The clutch parts thus far described are conventional in nature. Reference will now be made to the details of construction of the hydraulic unit 22 which is designed to control axial movement of the collar 34. The hydraulic unit 22 is shown as being a self-contained assembly adapted to be wholly disposed with the clutch cover assembly and non-rotatably supported therein between a ball bearing 74 supported on the collar 34 and a ball bearing 76 supported within a central bore 78 provided in the housing 28.

More particularly, the hydraulic unit 22 consists of an axially fixed annular housing 80 having a reduced diameter hub 82 extending into the bore 78 and piloted therein by the ball bearing 76. Spaced axially inwardly of axially fixed housing 80 is an axially movable housing 84 which is coupled to the fixed housing 80 by a sliding connection so that while being prevented from rotating relative to the fixed housing 80, it is axially movable relative thereto. The movable housing 84 is formed with an internal recess 86 for receiving ball bearing 74. As best seen in FIG. 2, the bearing 74 is internally located with respect to the movable housing 84 while the bearing 76 is externally located with respect to the fixed housing 80. The bearing locations serve to provide a mounting for the hydraulic unit 22 which will not impose any thrust loads on the flywheel 18.

The sliding connection between the fixed housing 80 and movable housing 84 is accomplished by a plurality of circumferentially spaced grooves 88 constructed on the interior of the fixed housing 80 and a similar number of circumferentially spaced tongues 90 constructed on the movable housing 84.

Control means is disposed between the fixed and movable housings 80 and 84 for effecting axial movement of housing 84 relative to housing 80. The control means comprises an annular piston 96 and an annular diaphragm 92 secured to the axial interior side of the fixed housing 80 so as to provide an annular control chamber 94 therebetween. Diaphragm 92 is adapted to operatively engage the piston 96 which is secured to the exterior of the movable member 84. Porting 98 is formed in the fixed housing 80 and connected to the control chamber 94 by a passage 100. If desired, the piston 96 may be constructed as an integral part of the movable member 84 and accordingly the piston would be considered as being supported by the collar 34.

A source of pressure 102 is provided to control operation of the hydraulic unit 22. A manifold 104 is sealingly secured to the outside of hub 82 of the fixed housing 80 by bolts 106. Suitable conduit means 108 connects the source of pressure 102 with inlet porting 110 in the manifold 104 so that when pressure is introduced into conduit means 108 it will flow into the inlet porting 110, to porting 98 in the fixed housing 80 and through passage 100 into the control chamber 94. Pressure introduced in this manner causes expansion of the diaphragm 92 and thereby an application of axial force on the piston 96 causing the collar 34 to shift axially inwardly toward the flywheel 18.

Piston 96 is somewhat J-shaped in cross-section including radially spaced inner axially extending annular piston flange 96a and outer axially extending shorter annular piston flange 96b interconnected by a radially extending annular piston wall 96c. Piston wall 96c is positioned so as to engage the outer face of the diaphragm 92 and, as seen in FIG. 2, is aligned with the control chamber 94. Thus, the piston wall 96c serves as an operating portion of the piston 96 when pressure enters the chamber 94 causing the diaphragm 92 to expand. The piston 96 is secured to the movable member 84 by means of the piston flange 96a which has its free end pressed on a reduced diameter shoulder 84a formed thereon.

The means for securing the diaphragm 92 to the interior of the fixed housing 80 consists of inner and outer rings 112 and 113. More specifically, each ring 112 and 113 is provided with an annular radially extending flange 112a and 113a overlying the inner and outer edges of the diaphragm 92. A plurality of circumferentially spaced aligned openings are formed in the flanges 112a and 113a, the inner and outer edges of the diaphragm 92 and in the fixed housing 80 for receiving a series of machine screws 80a which serve to sealingly secure the diaphragm 92 about the control chamber 94. Further, rings 112 and 113 are constructed with angularly inwardly disposed walls 112b and 113b, respectively. These walls 112b and 113b are in contact with the diaphragm 92 and located on opposite sides of the control chamber 94. Walls 112b and 113b are shaped to act as contour guides to maintain the curvature of the diaphragm 92 in proper relation to the piston wall 96c when the control chamber 94 is pressurized. Extending in an axial direction from the walls 112b and 113b are inwardly projecting legs 112c and 113c, respectively. Leg 112c is spaced radially inwardly of piston flange 96a while leg 113c is spaced radially outwardly of piston flange 96b. With this arrangement, when pressure is exhausted from control chamber 94 and springs 68 respond to withdraw the actuator collar 34 and thereby the movable member 84, the piston 96 will move within the space provided between the legs 112c and 113c.

In the preferred embodiment, the various parts of the hydraulic unit 22 are such that they are designed to occupy the existing space normally taken up by the mechanical components of a conventional mechanically actuated clutch of the type shown.

Grounding means is provided to prevent the hydraulic unit 22 from rotating with to the operating parts of the clutch 10. This is accomplished in the preferred embodiment by providing a boss 114 on the inlet end of the manifold 104 adapted to fit within a notch 116 formed in a transmission front bearing cover 118. The bearing cover 118 is conventional in nature and can be secured to the front of the transmission 14 in any well known manner. Since the fixed housing 80 is connected directly to the manifold 104 and the movable housing 84 is slidably connected to the fixed housing 80 by means of the tongue and groove, 90 and 88, respectively, the entire hydraulic unit 22 is prevented from rotating with respect to the operating parts of the clutch 10.

It will be evident from the foregoing that a friction clutch is provided which is pressure engaged and spring released. The pressure engagement is accomplished when a vehicle operator actuates a suitable control (not shown) to direct pressure from the source of pressure 102 through the various ports and passages into the control chamber 94. This causes the diaphragm 92 and piston 96 to operate the movable housing 84 and thereby the collar 34 to pivot the inner end levers 36 inwardly to apply a clamping force on the friction disc assemblies 64 and 66.

When the operator actuates the control to exhaust pressure from the control chamber 94, the parts are axially shifted away from the flywheel 18 by action of the springs 68 to release the clamping pressure.

Thus, it will be seen that the objects and advantages of the present invention have been achieved by providing springless pneumatically operated friction clutch in which a compact hydraulic unit is wholly disposed within the clutch cover assembly and is constructed and arranged so that the clamping load is applied internally to a rotatable pressure place by a non-rotating diaphragm actuated piston. In addition, a hydraulic unit has been shown and described which is constructed and arranged to be coaxial with and in surrounding relation to the transmission input shaft. Further, the means by which the hydraulic unit is mounted within the clutch cover assembly is such that no thrust loads are imposed on the flywheel.

It is to be understood that while the present invention has been shown and described in connection with a pull-type double plate clutch, it will be evident that the principles of the invention could be provided in other types of clutches, e.g. single plate or spring engaged and pressure released. Accordingly, the scope of the invention is not to be limited by the example given but is to be assessed as defined by the appended claims.

What is claimed is:

1. In a friction clutch adapted to drivingly connect rotatable drive and driven members, a cover secured to the drive member for rotation therewith, a pressure plate rotatably drivable by the cover and axially movable relative thereto, the pressure plate selectively engageable with the driven member, pivotable levers disposed between the cover and pressure plate for moving the pressure plate axially relative to the cover, and a collar rotatably drivable by the cover and axially movable relative thereto, the collar selectively engageable with the levers for effecting pivotal movement thereof; the improvement comprising a non-rotatable hydraulic unit including:

a housing supported by the cover,
a piston assembly supported by the collar, a sliding connection interconnecting said housing and said piston assembly, said sliding connection including an axially extending tongue on said piston assembly slidably received in said groove, an expansible diaphragm secured to said housing and engageable with said piston assembly, a pressure chamber between said diaphragm and said housing, porting in said housing for pressurizing said pressure chamber, and means for biasing the collar toward the cover.

2. A clutch according to claim 1 wherein a pair of axially spaced bearings support said housing with respect to the cover and said piston assembly with respect to the collar to permit rotation of the cover and collar relative to said housing and said piston assembly.

3. A clutch according to claim 2 wherein one of said bearings is externally mounted on said housing and the other of said bearings is internally mounted in said piston assembly.

4. A clutch according to claim 2 wherein grounding means is connected to said housing to prevent said housing and piston assembly from rotating relative to the cover and collar.

* * * * *